W. N. BLANCHARD.
HINGE.
APPLICATION FILED JUNE 18, 1913.

1,087,709.

Patented Feb. 17, 1914.

2 SHEETS—SHEET 1.

WITNESSES
E. W. Callaghan
C. E. Tramor

INVENTOR
WILLIAM N. BLANCHARD,
BY Munn & Co.
ATTORNEYS

W. N. BLANCHARD.
HINGE.
APPLICATION FILED JUNE 18, 1913.
1,087,709.
Patented Feb. 17, 1914.
2 SHEETS—SHEET 2.
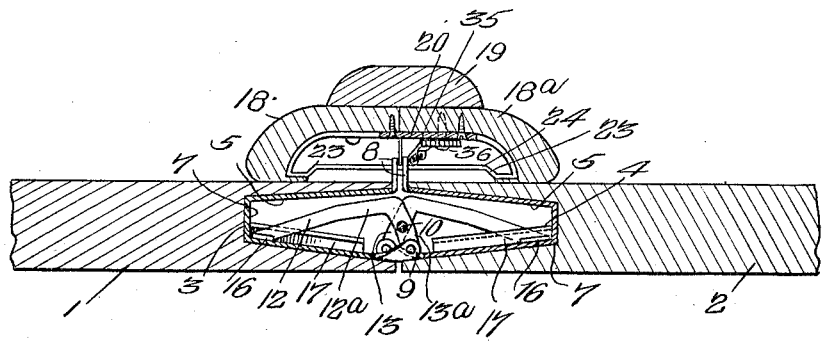
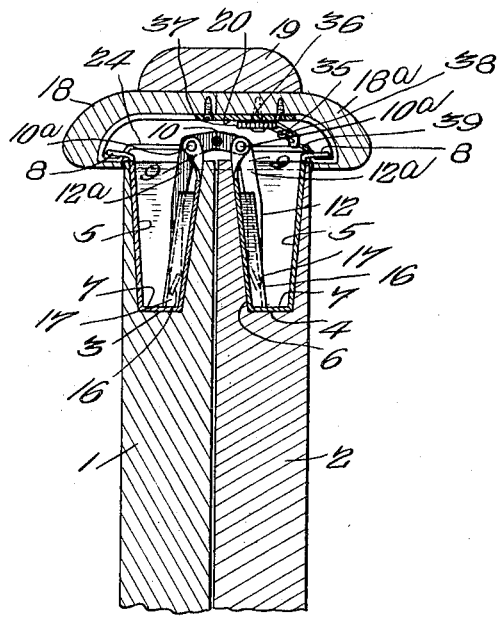
WITNESSES
E. M. Callaghan
C. E. Trainor
INVENTOR
WILLIAM N. BLANCHARD,
BY
ATTORNEYS

UNITED STATES PATENT OFFICE.

WILLIAM N. BLANCHARD, OF EAST ST. LOUIS, ILLINOIS.

HINGE.

1,087,709.   Specification of Letters Patent.   Patented Feb. 17, 1914.

Application filed June 18, 1913.   Serial No. 774,352.

*To all whom it may concern:*

Be it known that I, WILLIAM N. BLANCHARD, a citizen of the United States, and a resident of East St. Louis, in the county of St. Clair and State of Illinois, have invented a new and useful Improvement in Hinges, of which the following is a specification.

My invention is an improvement in hinges, and has for its object to provide a hinge for general use, wherein the principal portion of the mechanism is arranged within the members to be hinged together, and means is provided in connection with the said mechanism for engagement by a cover, hood or blind to conceal the joint and the hinge.

Figure 1:
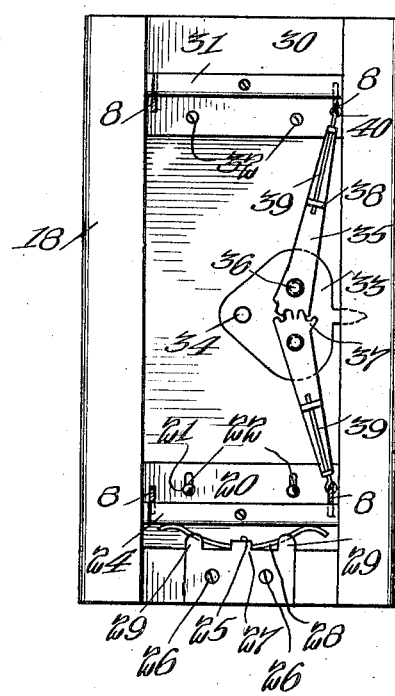
Figure 2:
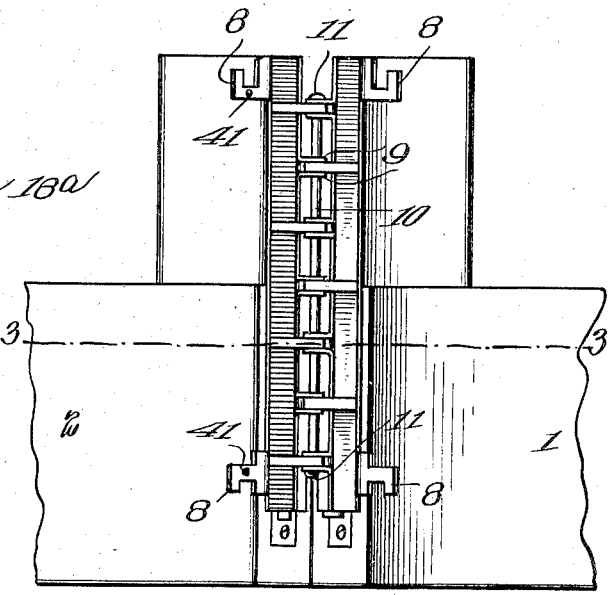
Figure 3:
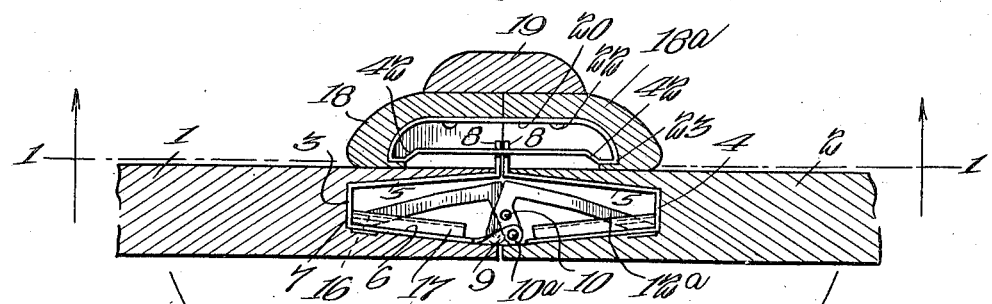
Figure 4:
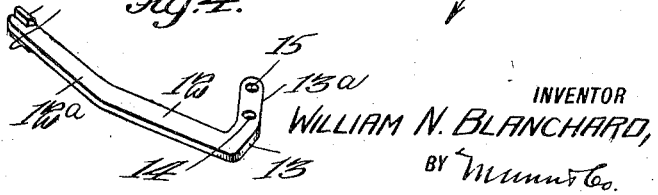

In the drawings: Figure 1 is a section on the line 1—1 of Fig. 3, Fig. 2 is a top plan view of the hinge with the blind or cover removed, Fig. 3 is a section on the line 3—3 of Fig. 2, Fig. 4 is a detail perspective view of one of the elbow levers, Fig. 5 is a transverse vertical section of the hinge, showing the hinge and the hinge members in normal position, and Fig. 6 is a similar view showing the hinge members in closed position.

The present embodiment of the invention is shown in connection with members 1 and 2, for hinging the said members together, and each of the said members is recessed at its meeting edge as indicated at 3 and 4 respectively. A casing is arranged within each of the said recesses, each of the said casings being formed from a plate of metal, bent to form side walls 5 and 6, connected at their outer edges by a transverse web 7, and the side walls 5 and 6 diverge from each other toward the meeting edge of the members 1 and 2, and the recesses 3 and 4 are shaped to correspond with the shape of the casings. Each of the said casings is provided at the free edge of the side wall 5 and at each end of the said edge with an angular lug 8, the said lugs extending laterally beyond the adjacent face of the members 1 and 2. At the free side edge of the opposite side wall 6, each of the said casings is provided with a plurality of pairs of bearing lugs 9, the said lugs extending across the meeting line of the members 1 and 2.

A plurality of levers is provided for connecting the casings together and for providing a hinged connection between the said casings. Each lever is an integral construction and consists of two arms arranged at approximately a right angle to each other, and each arm consists of two portions. One of the arms is of greater length than the other and consists of two portions 12 and 12$^a$, while the short arm consists of portions 13 and 13$^a$. Each of the levers is provided with an opening 14 at the junction of the portions 13 and 13$^a$, with each other, and each lever is provided with another opening 15, at the free end of the portion 13$^a$. The free end of each of the portions 12$^a$ of the levers is provided with a pair of oppositely extending lugs 16, and all of the elbow levers are pivoted on a rod or hinge bolt 10, the said rod or hinge bolt passing through the openings 14 of the levers and having its ends headed as indicated at 11.

The levers are arranged in two series, one series within the casing of the hinge member 1 and the other series in the casing of the hinge member 2. The free end of each arm 12—12$^a$ extends toward the web 3 of the casing in which the lever is arranged, and is received between a pair of parallel spaced guides 17, each of the said guides being undercut to receive the lugs 16 at the end of the said arm 12—12$^a$. The angle between the arms of each lever is adjacent to the side wall 5 of the casing, and the ends of the arms 12—12$^a$ are slidable in the guides. The free end of the portion 13$^a$ of the arm 13—13$^a$ of each lever is pivoted between a pair of lugs 9, the pivot pin 10$^a$ which connects the lever to the lug passing through the lugs 9 and through the opening 15 of the said lever. Each pair of guides 17 is in alinement or in register with a pair of bearing lugs 9 of the opposite casing. That is, each pair of guides in one casing is in register or alinement with a pair of bearing lugs 9 of the other casing, and each lever is slidable at one end in one casing and pivoted at the other end to a pair of bearing lugs of the opposite casing. The series of levers in the casing of the member 1 are pivoted to the bearing lug of the casing in the hinge member 2, while the series of elbow levers in the casing of the hinge member 2 are pivoted to the bearing lugs of the casing in the hinge member 1.

The hinge members 1 and 2 may swing with respect to each other in the direction of the arrows below the said members in Fig. 3 and by means of the angular lugs 8, a cover or blind may be arranged above the hinge to conceal the same and to conceal the joint between the hinge members. The said blind or cover consists of three pieces or sections 18 and 18ª and 19. The pieces 18 and 18ª are each recessed on its under face at the inner edge thereof, and the said pieces are placed together so that the recesses coöperate to form an opening in the under face of the said pieces. The piece or section 19 is arranged longitudinally of the sections 18 and 18ª, transversely of the joint between the said pieces or sections.

A plate is arranged in the recess at each end thereof, one of the said plates 20 being provided with slots 21, which are engaged by headed pins 22, on the sections 18 and 18ª, to permit a limited longitudinal movement of the plate with respect to the sections. The plate 20 is curved to fit the recess of the sections 18 and 18ª, and the recess of the said sections is so formed that a longitudinally extending ledge 23 is provided at each side of the opening formed by the recess. The ends of the plate 20 are connected by a cross bar 24, the said bar being integral with the plate, and extending between the shoulders or ledges 23, but at a slightly higher level, and the said bar is in position for engagement by the lugs 8 of the casings. A plate 25 is secured at the end of the opening opposite the plate 20, by means of screws 26, and the said plate as well as the plate 20 is arranged transversely of the joint between the sections 18 and 18ª.

The plate 25 is provided at its inner side and intermediate the ends thereof with a clip 27, for engaging the center of an arch plate spring 28, the concavity of the spring being toward the bar 24. The ends of the spring engage the outer side edge of the bar, and the plate 20 is provided with longitudinally extending lugs 29 at each end for engaging below the spring to prevent downward movement of the ends thereof. At the opposite end of the sections, a plate 30 is arranged in the same manner as the plate 20, the ends of the plate being connected by a cross bar 31. The plate is secured to the sections by means of screws 32, and the bar 31 is adapted for engagement by the lugs 8 at the opposite end of the casings. The overlying portion of the angular lugs 8 at each end of the hinge extends in opposite directions, and the said lugs engage the bars 24 and 31 from the inner sides thereof. The bar 20 is movable longitudinally within limits defined by the slots 21, to permit the engagement and disengagement of the blind or cover with the hinge.

The spring 28 normally holds the plate 20 in the position of Fig. 1, that is, in a position to cause the bars 24 and 31 to engage beneath the over-lying portion of the lugs 8.

A heart-shaped plate 33 is secured to the sections within the opening by means of a screw or nail 34, and levers 35 are pivoted to the plate, each of the said levers being of approximately triangular shape and having its large end inward. The levers are pivoted to the plate by screws or nails 36, and each lever is provided at its inner end with a segment of gear teeth 37, the said segments meshing with each other. Each lever is also provided near its outer or small end with spaced bearing lugs 38, and a rod 39 is held in each pair of lugs. Each rod is provided with a hook 40 at its outer end, the said hook engaging an opening 41 in one of the lugs 8.

In operation with the cover removed, the hinge members 1 and 2 may swing as shown by the arrows in Fig. 3, and when so swung, the ends of the arms 12 of the elbow levers move in the guides 17, and the hinge members will close flat against each other. With the cover in place, when the hinge members 1 and 2 are swung in the direction of the arrows below the same in Fig. 3, they may be swung into position alongside each other, and the inner edges thereof will engage and fit within the space between the inner edges of the shoulders 23 of the blind or cover. The blind or cover thus perfectly protects and conceals the joint, whether the hinge members are in open or in closed position. The lugs 8 slide on the cross bars 24 and 31, and when the hinge members are folded alongside each other, the said lugs engage the inclined portion 42 of the said cross bars, the said portions 42 being formed by the upward offsetting of the cross bars. The device comprising the plate 33, the levers 35, and the rods 39 constitutes an equalizing device for the hinge. The connection between the levers 35 causes the outer ends of the said levers to move at the same speed and consequently causes the lugs 8 to move at the same speed so that there will be no sticking or catching of the said lugs on the cross bars. The links 39 are of resilient material and are slidably connected with the levers, to permit some bending of the said links and some longitudinal movement thereof. It is necessary that the connection between the lugs 8 and the pivot pins 36 be an expansible and contractible connection in order to permit the lateral movement of the lugs in a straight line. The particular form of the hinge permits the hinge members 1 and 2 to take a position alongside each other and without disengaging the blind or cover.

I claim:—

1. A hinge comprising in combination with the hinge members, each having a recess at its meeting edge, of a casing arranged in each recess, each casing consisting of oppositely arranged side walls and a connecting web, said web being at the inner side of the recess, one of the side walls of each casing having outwardly extending lugs at its ends extending beyond the hinge members, the opposite side wall having a series of pairs of bearing lugs, a plurality of series of levers, each consisting of a long and a short arm arranged at an angle with respect to each other, the free end of the long arm having a pair of oppositely arranged laterally extending lugs and the short arm having spaced openings, one of the series being in each of the casings, the side wall of the casing provided with the bearing lugs having an undercut guideway in alinement with each pair of bearing lugs of the other casing, and the long arm of each lever extending toward the web of the casing, the lugs of the arms engaging the guides, the free end of the short arm of each lever being pivoted between the bearing lugs in alinement with the guides, a pivot rod passed through the other openings of the levers for pivoting the said levers together intermediate the free end of the short arm and the junction between the arms, and a blind or cover having means for engagement by the lugs of the first-named side wall to hold the said blind or cover in place over the joint between the hinge members.

2. A hinge comprising in combination with the hinge members, each having a recess at its meeting edge, of a casing arranged in each recess, each casing consisting of oppositely arranged side walls and a connecting web, said web being at the inner side of the recess, one of the side walls of each casing having outwardly extending lugs at its ends extending beyond the hinge members, the opposite side wall having a series of pairs of bearing lugs, a plurality of series of levers, each consisting of a long and a short arm arranged at an angle with respect to each other, said levers being arranged in series, one of the series in each casing, a pivotal connection between the free end of the short arm of each lever and a pair of bearing lugs of the opposite casing, a slidable connection between the free end of the long arm of each of the said levers and the last-named side wall of the casing in which the lever is arranged, each of the said levers having an opening intermediate the free end of the short arm and the junction of the arms and a pivot rod passing through the said openings for pivotally connecting the levers together, and a blind or cover having means for engagement by the lugs of the first-named side wall to hold the said blind or cover in place over the joint between the hinge members.

3. A hinge comprising in combination with the hinge members, each having a recess at its meeting edge, of a casing arranged in each recess, each casing consisting of laterally spaced side walls, one of the side walls of each casing having a series of spaced bearing lugs at its outer edge, a series of levers in each casing, each lever comprising a long arm having a slidable connection at its free end with the casing in which it is arranged, and a short arm pivoted at its free end to a bearing of the opposite casing, each of the said levers having an opening intermediate the free end of the short arm and the junction of the arms, and a pivot rod engaging the said openings for pivotally connecting the levers, the other side wall of each casing having lateral lugs extending beyond the hinge members, the lugs being at the opposite ends of the said side wall, and each lug being notched on its outer side edge, a blind or cover having a longitudinally extending recess on its inner face and a cross bar at each end of the recess, one of the said cross bars being slidable toward and from the other cross bar for permitting the engagement and disengagement of the lugs, a spring normally holding the movable cross bar in engaging position, a pair of oppositely arranged levers pivoted to the blind or cover within the recess, each lever having a series of gear teeth at its inner end, said teeth being arc-shaped and concentric with the pivotal connection of the lever, the teeth of the levers intermeshing, links slidably connected with the free ends of the lever at one end of the links, each link being pivoted to a lug at its outer end, said links being pivoted to adjacent lugs at opposite ends of the casing.

4. A hinge comprising in combination with the hinge members, each having a recess at its meeting edge, of a casing arranged in each recess, each casing consisting of laterally spaced side walls, one of the side walls of each casing having a series of spaced bearing lugs at its outer edge, a series of levers in each casing, each lever comprising a long arm having a slidable connection at its free end with the casing in which it is arranged, and a short arm pivoted at its free end to a bearing of the opposite casing, each of the said levers having an opening intermediate the free end of the short arm and the junction of the arms, and a pivot rod engaging the said openings for pivotally connecting the levers, the other side wall of each casing having lateral lugs extending beyond the hinge members, the lugs being at the opposite ends of the said side wall and each lug being notched on its outer side edge, a blind or cover having a longitudinally extending recess on its inner face and a cross bar at each end of the recess, one of the said cross bars being slidable toward and from the other cross bar for permitting the engagement and disengagement of the lugs, a spring normally holding the movable cross bar in engaging position, and a connection between adjacent lugs at the opposite ends of the blind or cover for constraining the said lugs to move together.

5. A hinge comprising in combination with the hinge members, each having a recess at its meeting edge, of a casing arranged in each recess, each casing consisting of laterally spaced side walls, one of the side walls of each casing having a series of spaced bearing lugs at its outer edge, a series of levers in each casing, each lever comprising a long arm having a slidable connection at its free end with the casing in which it is arranged, and a short arm pivoted at its free end to a bearing of the opposite casing, each of the said levers having an opening intermediate the free end of the short arm and the junction of the arms, and a pivot rod engaging the said openings for pivotally connecting the levers, the other side wall of each casing having lateral lugs extending beyond the hinge members, the lugs being at the opposite ends of the said side wall, and each lug being notched on its outer side edge, a blind or cover having a longitudinally extending recess on its inner face and a cross bar at each end of the recess, one of the said cross bars being slidable toward and from the other cross bar for permitting the engagement and disengagement of the lugs, and a spring normally holding the movable cross bar in engaging position.

6. A hinge comprising in combination with the hinge members, each having a recess at its meeting edge, of a casing arranged in each recess, each casing consisting of laterally spaced side walls, one of the side walls of each casing having a series of spaced bearing lugs at its outer edge, a series of levers in each casing, each lever comprising a long arm having a slidable connection at its free end with the casing in which it is arranged, and a short arm pivoted at its free end to a bearing of the opposite casing, each of the said levers having an opening intermediate the free end of the short arm and the junction of the arms, and a pivot rod engaging the said openings for pivotally connecting the levers, a blind or cover for concealing the joint between the hinge members, the other side wall of each casing having lugs extending beyond the hinge members, said blind or cover having means for engagement by the lugs to hold the blind or cover in place, said lugs being slidable with respect to the engaging means to permit the hinge members to swing with respect to each other while holding the cover in place.

7. A hinge comprising in combination with the hinge members, each having a recess at its meeting edge, of a casing arranged in each recess, each casing consisting of laterally spaced side walls, one of the side walls of each casing having a series of spaced bearing lugs at its outer edge, a series of levers in each casing, each lever comprising a long arm having a slidable connection at its free end with the casing in which it is arranged, and a short arm pivoted at its free end to a bearing of the opposite casing, each of the said levers having an opening intermediate the free end of the short arm and the junction of the arms, and a pivot rod engaging the said openings for pivotally connecting the levers.

8. A hinge comprising in combination with the hinge members, each having a recess at its meeting edge, of a hinge leaf in each recess, each leaf having bearing lugs, a series of levers in connection with each leaf, each of the said levers consisting of two arms at an angle with respect to each other, one arm of each lever having a slidable connection with the adjacent leaf, the other arm of each lever being pivoted to a bearing lug of the other leaf, each of the said levers having openings intermediate the ends of the short arm, and a pivot pin passing through the said openings to pivotally connect the said arms, a blind or cover having cross bars at its ends, one of the said cross bars being movable laterally, the hinge members having lugs for engaging the cross bars to hold the blind or cover in place, and a spring normally holding the movable cross bar in engaging position.

9. A hinge comprising a plurality of hinge leaves, a series of levers in connection with each leaf, each lever consisting of two arms arranged at an angle with respect to each other, one arm of each lever having a slidable connection with the adjacent leaf and the other arm of each lever being pivoted to the other leaf, a common pivot pin engaging all of the levers intermediate their connection with the other leaf and the junction of the arms, a cover having cross bars on its under face, each hinge leaf having angular lugs for engaging the cover, one of the cross bars of the cover being movable to permit the engagement of the lugs.

10. A hinge comprising a plurality of leaves, and a series of levers for each leaf, each lever comprising an arm slidably connected with the leaf adjacent to the series and an arm hinged to the other leaf, a common pivot pin engaging the last-named arm of all of the levers intermediate the ends of the said arms, a cover for the joint between the leaves, and means in connection with the leaves and the cover for detachably engaging the cover to hold it in place over the joint.

11. A hinge comprising leaves, each of the said leaves consisting of laterally spaced walls connected at the side edges of the walls remote from the other leaf, a hinge connection between one of the walls of each leaf and the adjacent wall of the other leaf, a cover for the joint between the leaves, and means in connection with the cover and the other wall of each leaf for detachably connecting the cover to hold it in place over the joint.

12. A hinge comprising a plurality of leaves, each leaf consisting of a casing having its inner side open, a hinge connection between the casings at one side thereof, a cover at the opposite side, and a detachable connection between the said cover and the said opposite sides of the casing.

13. A hinge comprising a plurality of leaves, a hinge connection between the leaves, a cover for the joint between the leaves, and means in connection with the cover and the leaves for detachably holding the cover over the joint.

WILLIAM N. BLANCHARD.

Witnesses:
  JESSIE TAYLOR,
  EDNA M. ADAMS.